May 5, 1953 A. C. ROSS 2,637,133
ANGLER'S FISH LANDING NET
Filed June 16, 1949 4 Sheets-Sheet 2
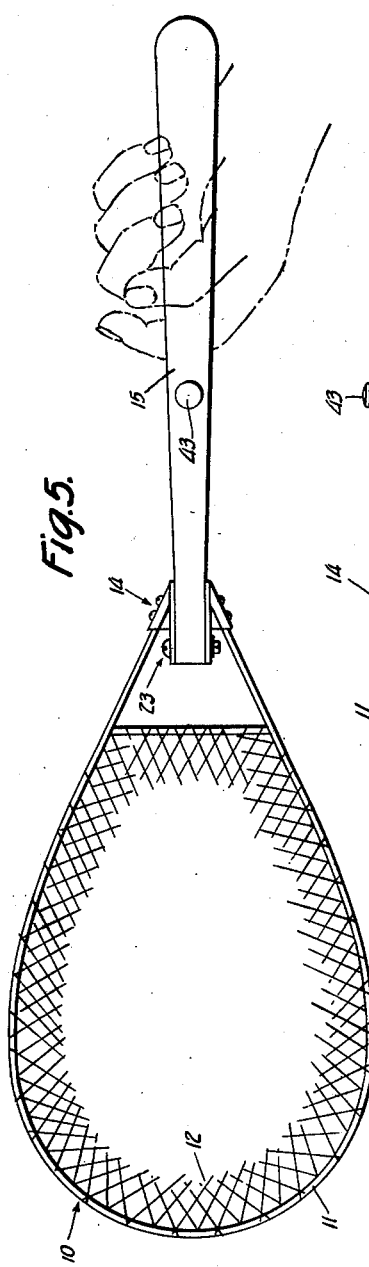
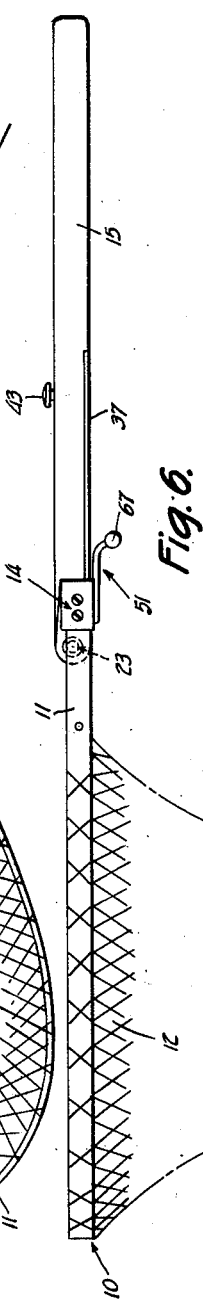
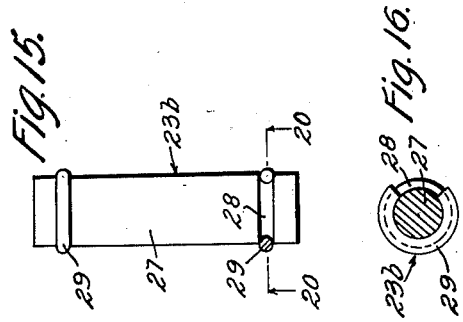
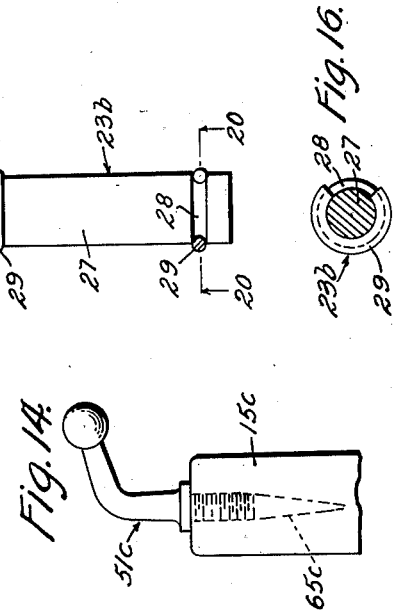
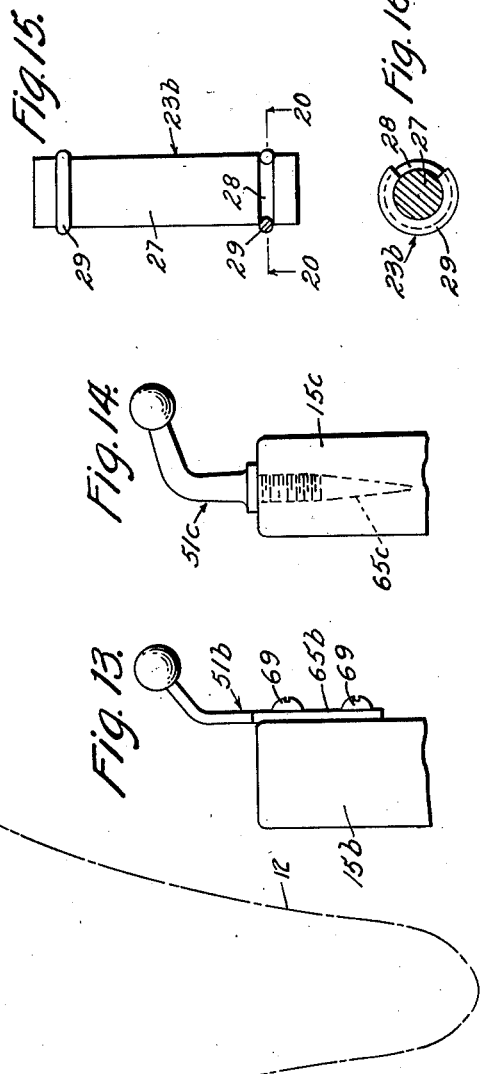
INVENTOR.
Alfred C. Ross
BY
Moser, Nolte, Crews & Berry
ATTORNEYS

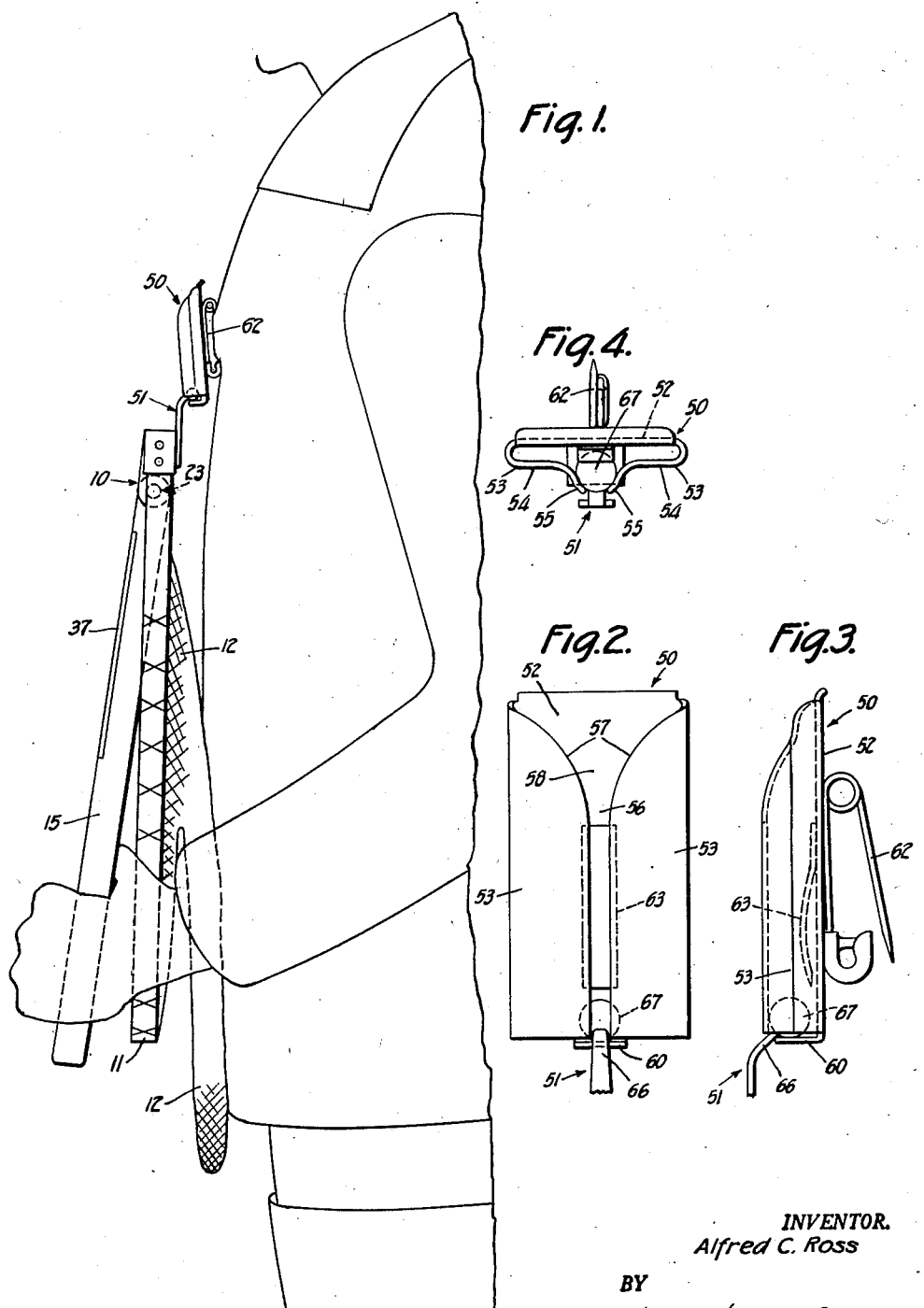

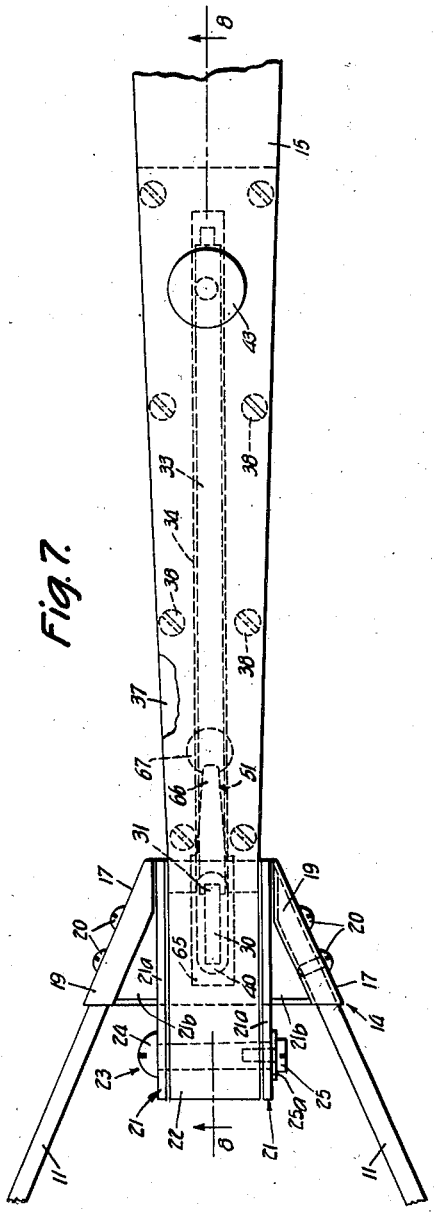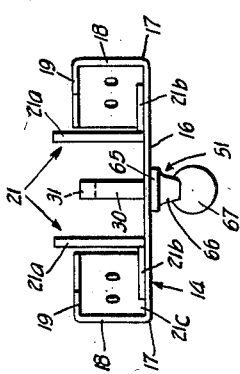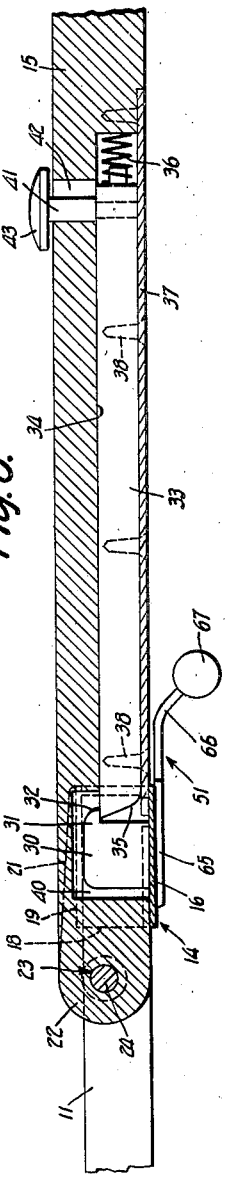

May 5, 1953  A. C. ROSS  2,637,133
ANGLER'S FISH LANDING NET
Filed June 16, 1949  4 Sheets-Sheet 4
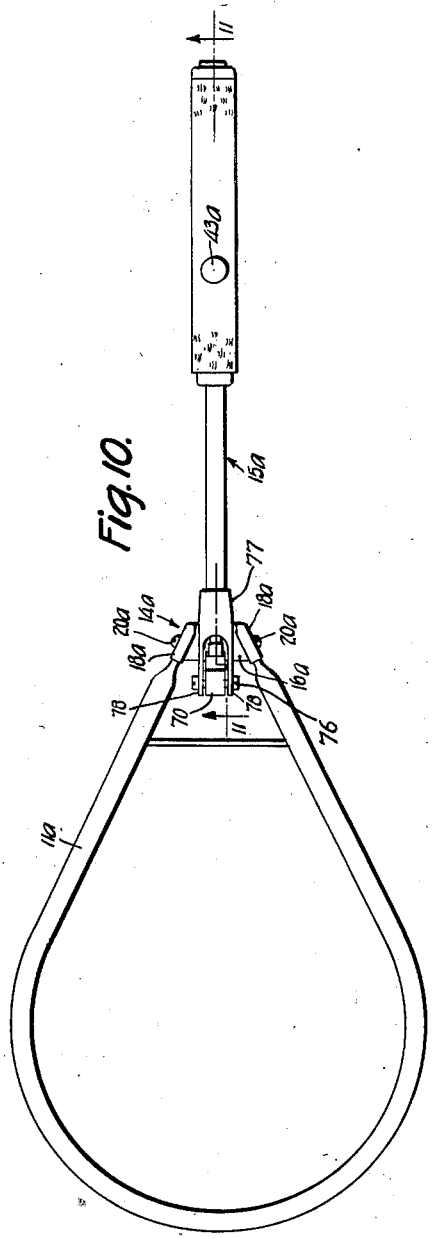
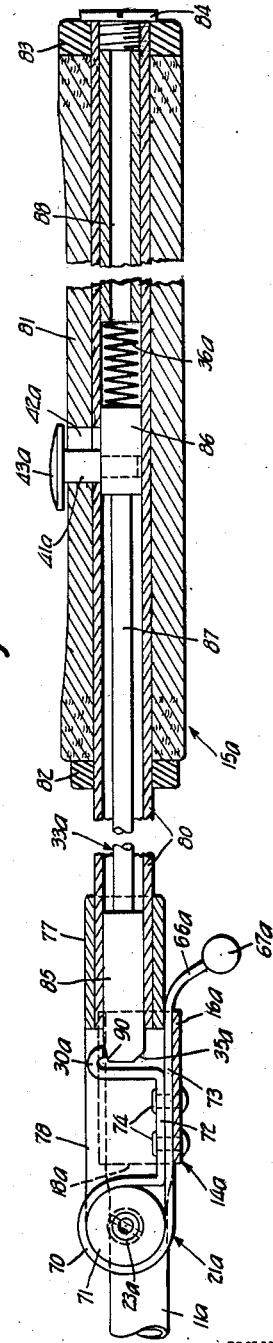
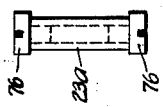
INVENTOR.
Alfred C. Ross
BY
Moser, Nolte, Crew & Berry
ATTORNEYS Patented May 5, 1953

2,637,133

UNITED STATES PATENT OFFICE 2,637,133

ANGLER'S FISH LANDING NET

Alfred C. Ross, Jackson Heights, N. Y.

Application June 16, 1949, Serial No. 99,379

14 Claims. (Cl. 43—12)

The present invention relates to improvements in angler's fish landing nets and in suspension devices therefor.

When an angler has hooked and played a fish and is ready to land it, he is, at that instant, holding his fishing rod in one hand and has, therefore, only his other hand available for manipulating the landing net. This landing net should be manipulated by his other hand, while maintaining the line taut and the fish under control.

Among the objects of the present invention are to provide a new and improved angler's foldable fish landing net and a new and improved suspension device therefor, which permits the landing net to be suspended when not in use comfortably and in an easily accessible position from the angler's garment or creel harness without hampering the movements exercised while he is wading, fishing or walking, and which permits the net to be disengaged easily from the support by one hand, to be manipulated easily into fish landing position with minimum of effort, and to be restored by the same hand, after landing the fish, in an inoperative position on the angler's garment or creel harness ready for the next fishing operation, without the mesh of said net becoming entangled, snarled or enmeshed with the structural members of the net itself.

Various other objects will be apparent from the following particular description and from an inspection of the accompanying drawings, in which:

Fig. 1 is a side elevation of a form of foldable fish landing net and a suspension device therefor embodying certain features of the present invention, said net being shown suspended in inactive position from the angler's garment or creel harness by means of said suspension device and ready to be disengaged for instant use;

Fig. 2 is a front view of one form of clasp and the engaged clasp hook or catch constituting the suspension device for the net;

Fig. 3 is a side view of the clasp and catch shown in Fig. 2;

Fig. 4 is an end view of the clasp and catch shown in Fig. 2;

Fig. 5 is a top plan view of the landing net shown in distended position ready for use;

Fig. 6 is a side view of the distended landing net;

Fig. 7 is a fragmentary detailed top plan view of the distended landing net;

Fig. 8 is a section of the distended landing net taken along lines 8—8 of Fig. 7;

Fig. 9 is an end view, the frame member being omitted, of the hinge connection between the net frame and the net handle as seen from the left in Fig. 7;

Fig. 10 is a top plan view of another form of landing net embodying the present invention and shown in distended position;

Fig. 11 is a section of the distended landing net taken along the lines 11—11 of Fig. 10;

Fig. 12 is a plan view of a form of pivot mounting for the handle, which may be employed in the form of the invention shown in Fig. 10;

Fig. 13 is a side view of another form of catch which may be employed in accordance with the present invention and which is shown connected to the outer end of a net handle;

Fig. 14 is a side view of still another form of catch which may be employed in accordance with the present invention and which is shown connected to the outer end of a net handle;

Fig. 15 is a plan view of another form of pivot mounting for the handle, which may be employed in place of the pivot mounting, in the form of the invention shown in Figs. 1–8; and Fig. 16 is a section of the pivot mounting taken on lines 20—20 of Fig. 19.

Referring to Figs. 1–9 of the drawings, the fish landing net 10 comprises a frame 11 in the form of a near oval hoop to which a folding net fabric 12 is secured in any suitable manner. This frame 11 comprises a strip of any suitable lightweight material, as for example, plastic, aluminum, plywood, bamboo, and has its ends secured to a bracket 14 forming part of the hinge connection between said frame and a handle 15. This bracket 14 is desirably made from metal formed, moulded, or cast into substantially U-shape and has a base 16 with sides 17 of the base 16 converging away from the frame 11 to conform with the converging configuration of the frame ends, upstanding converging side walls 18 and top flanges 19 turned towards each other from the upper edges of said side walls, respectively, to define channels for receiving snugly the ends of the frame 11. These frame ends are secured to the side bracket walls 18 by any suitable means, as for example, screws 20.

Secured to the bracket base 16, as for example, by welding, are two hinge supports 21 desirably of metal and in the form of parallel plates 21a with lateral extensions 21b. These extensions at their outer ends form with the side walls 18 channels 21c (Fig. 9) to receive the ends of the frame 11. The side walls 18 project inwardly at their upper ends and extend over the upper edges of the frame 11. The handle 15 which may be of any suitable material, for example, wood, has its inner end section 22 rectangular in cross-section and fitting loosely between the hinge supports 21. A pivot 23 hingedly connects the handle 15 to the hinge supports 21. This pivot comprises a headed pin 24 passing through the hinge supports 21 and through the handle 15 and impinging upon a washer 25a, a headed screw 25 passing through the washer and threaded into the end of said pin 24.

In Figs. 15 and 16 is shown another form of pivot mounting 23b which may be employed to hingedly connect the handle 15 to the hinge supports 21. This pivot mounting comprises a pivot shaft 27 passing through the hinge supports 21 and through the handle 15 and having annular grooves 28 receiving snap rings 29 engaging the outer sides of said hinge supports to hold said pivot shaft against axial movement.

By means of the construction so far described, the landing net may be collapsed or folded into a compact unit by swinging the handle 15 about the pivot 23. In extended operative position shown in Figs. 5, 6 and 7, the inner end handle section 22 seats on the base 16 of the bracket 14, so that the net frame 11 in this extended position is locked by said bracket against pivotal movement in either direction (Fig. 6) with respect to said handle 15. To releasably lock the net frame 11 against pivotal movement in either direction with respect to the handle 15, in extended position shown in Fig. 6, there is provided a latch device comprising a catch 30 in the form of a plate secured to the base 16 of the bracket 14 by any suitable means, as for example, rivets, and having a hook 31 with a cam edge 32. For releasably engaging this catch 30, there is provided a slide piece 33 in the form of a bolt of rectangular cross-section disposed in a recess 34 in the underside of the handle 15, and having its inner end bevelled to define a cam follower edge 35. This slide bolt 33 is loaded towards the catch 30 by a coil spring 36 and is retained in the recess 34 by a plate 37, of metal or the like, secured to the underside of the handle 15, as for example, by screws 38. This bolt retaining plate 37 at its inner end is short of the corresponding end of the recess 34, to define an opening 40 through which the catch 30 can extend for entry into the recess 34, when the landing net is fully extended into the operative position shown in Figs. 5, 6 and 7.

To permit manual withdrawal of the slide bolt 33 out of latched engagement with the catch 30, there is secured to said slide bolt a pin 41, extending through an opening 42 in the handle 15 and terminating at its end in an accessible finger head or button 43. While the handle 15 is grasped by a hand of the angler, the thumb of said hand can engage the button 43 and move it towards the outer end of said handle, to withdraw the slide bolt 33 out of latched engagement with the catch 30. With the slide bolt 33 so disengaged, the net frame 11 is free to swing clockwise (Fig. 6) about the pivot 23 with respect to the handle 15 for folding.

For supporting the folded landing net from a part of the angler's garment or creel harness, there is provided a clasp 50 (Figs. 1-4) adapted to be releasably attached to the garment or creel harness and a catch 51 secured to the landing net and adapted to be releasably fastened to said clasp. The clasp 50 is of metal, plastic, or the like, and is in the general form of a channel having a rear plate 52 of generally rectangular shape, and side flanges 53 bent inwardly towards each other from the side edges of said rear plate. These side flanges 53 have their inner sections 54 near their bends extending substantially parallel to the rear clasp plate 52 and their outer marginal sections 55 spaced to define an essentially up and down guideway 56 in the form of an opening therebetween along which the catch 51 can slide and curved away from said rear plate to conform with the configuration of the catch 51, as shown in Fig. 4. The side flanges 53 have their upper edges 57 convexly bevelled and converging downwardly, to define a catch entry mouth 58 for the opening 56.

A tab catch abutment or flange 60 extends forwardly from the lower end of the rear plate 52 to retain the catch 51 against withdrawal from the lower end of the clasp 50.

For releasably securing the clasp 50 on to a part of the angler's garment or creel harness, there is secured, for example, by welding, molding, brazing, to the back side of the rear clasp plate 52, a safety pin 62.

The clasp 50, aside from the safety pin 62, may be made from a single blank of sheet metal or from any other suitable material in one piece, bent or shaped to form the side flanges 53 and the bottom flange 60, or may be made of more than one member of metal, or plastic, fastened together in some suitable manner, such as rivets, screws, spot-welds, brazing, soldering, tonguing, staking or crimping, so that the side sections define side sections 53 with closure member near its extremity.

To retain yieldably the catch 51 in the clasp 50 against accidental withdrawal, there is secured to the front face of the rear clasp plate 52, by any suitable means, as for example, by soldering or riveting, a leaf spring 63.

The catch 51, desirably of metal, is substantially in the form of a hook, having a flat shank 65 along one end section secured to the underside of the bracket base 16, as for example, by rivets and having its other end section 66 reduced in cross-section to define a neck for slide movement in the clasp opening 56 and crooked away from the handle. This neck section 66 terminates in a head 67, desirably in the form of a spherical ball larger than the width of the clasp opening 56 and is adapted to be slipped into the channel 56 with the head 67 retained in said channel.

In the use of the landing net and the suspension device therefor, the clasp 50 is attached to the angler's outer garment or creel harness, as for example, on the left side of his chest, as shown in Fig. 1. The landing net is collapsed about the pivot 23 with the handle 15 folded against the net frame 11, and the pouch side of the net fabric 12 extending on the side of said frame opposite said handle. In this folded condition of the landing net, the handle 15 is grasped by a hand, and while the folded net is so held with the pouch side of the net fabric 12 nearest the angler's body, the catch head 67 is slipped into the clasp 50 along the clasp opening 56 by a simple manipulation. The landing net is thereby suspended comfortably and compactly from said clasp in a readily accessible manner. With the landing net so suspended, the angler can go about his walking, wading and/or fishing, without being hampered by said net. After he has caught a fish and has played it within netting range, while he is holding the rod with his right hand (assuming that he is right-handed) and maintaining the line taut, he grasps the handle 15 with his left hand, as shown in Fig. 1, lifts the handle to disengage the catch head 67 from the clasp 50 and by a simple whipping or casting movement flings the frame 11 and its fabric net 12 angularly outwardly about the pivot 23 into extended position with respect to said handle. As this frame 11 approaches this extended position, the catch 30 projecting into the opening 40 has its cam edge 32 on the hook 31 riding along the follower edge 35 of the slide bolt 33, thereby camming said slide bolt lengthwise against the action of the spring 36. After the hook 31 has cleared the follower edge 35 of the bolt 33, said bolt will slide underneath said hook under the action of the spring 36 to lock the handle 15 and the net frame 11 in extended position against folding action. In this locked position, the net can be employed to land the fish.

As the net frame 11 falls into extended position, the pouch side of the net fabric falls downwardly into operative position shown in Fig. 6. It is seen that the disengagement of the net from the catch 51 and its unfolding into operative position is effected without the mesh of the net becoming snarled, entangled or enmeshed, with the structural members of the net itself.

After the fish has been landed and taken out of the net, this net can be folded back into inoperative position by moving the button 43 towards the outer end of the handle 15 to disengage the slide bolt 33 from the catch 30, and flipping the net frame 11 over said handle. In the same one-handed movement, the net is placed on clasp 50 into guide-way 56 for suspension into inactive position, thus permitting the angler to continue fishing without delay.

Although the net suspension clasp 50 and catch 51 have been described in connection with a collapsible landing net, as far as certain aspects of the present invention are concerned, these suspension devices may be employed in connection with a landing net of conventional type having a handle rigidly and non-foldably secured to the frame net 11. In connection with such a landing net, the catch 51 could be secured to this handle near its outer end. In Fig. 13 is shown the manner in which the catch 51b corresponding to the catch 51 in the construction of Figs. 1–4, may be fastened to the outer end of a conventional handle 15b in the manner described. In this form of the invention, the catch 51b has a flat shank 65b secured to the underside of the outer end of the handle 15a, as for example, by screws 69.

Fig. 14 shows another manner in which the catch 51c may be fastened to the outer end of a conventional handle 15c in the manner described. In this form of the invention, the catch 51c has a screw shank 65c threaded into the outer end of the handle 15c.

In the form of the invention shown in Figs. 10, 11 and 12, the fish landing net comprises a frame 11a in the form of a near oval hoop to which a folding net fabric (not shown) is secured in any suitable manner. This frame 11a may be made of light weight material, such as aluminum tubing or any other suitable substance, and has its ends adapted to be secured to a bracket 14a forming part of the hinge connection between said frame and a handle 15a. This bracket 14a is similar to the bracket 14 in the construction of Figs. 1–9, and is similarly provided with side bracket walls 18a to which the ends of the frame 11a are secured, as for example, by screws 20a.

Secured to the bracket base 16a is a hinge support 21a comprising a single strip of metal wound to form an intermediate loop section 70 ridigdly embracing a pivot pin holder 71 in the form of a block and a pair of flat straight sections 72 and 73 resting on said bracket base in overlapping relationship and rigidly secured thereto, as for example, by rivets 74. The lower strip section 73 has a hook extension 66a reduced in cross-section to define a neck for slide movement in the clasp opening 56 (Figs. 1–4) and crooked away from the bracket base 16a. This neck section 68a terminates in a spherical head 67a similar to the head 67 in the form of the invention shown in Figs. 1–9, and similarly adaptable for engagement with the clasp 50.

The upper strip section 72 has an offset extension 30a in the form of a goose neck serving as a catch for the slide piece or bolt 33a, as will be more fully described.

The pivot pin holder 71 rigidly embraced by the loop section 70 of the hinge support 21a is in the form of a cylinder having an axial hole for receiving a pivot or arbor pin 23a. This pin 23a is in the form of a hollow cylinder and has screws 76 threaded into its ends to provide heads for said pin. The handle 15a has at its inner end a ferrule 77 which is desirably of lightweight material, such as aluminum, and which is provided with a pair of inward ear extensions 78 flanking the loop section 70 of the hinge support 21a and engaging the pin 23a between the ends of the pivot pin holder 71 and the corresponding heads of the screws 76. The pivot pin holder 71 may receive the pivot pin 23a with a bearing fit to permit said pin to rotate freely in said holder, and the ferrule ear extensions 78 may be rigidly secured to said pivot pin, as for example, by press fitting. By means of this construction, the handle 15a can move counterclockwise (Fig. 11) about the axis of the pivot pin 23a from the limiting extended position shown. The ferrule 77 seats on the part of the lower strip section 73 projecting beyond the catch 30a and rests thereby indirectly on the bracket base 16a and the handle 15a is, therefore, locked in this position against pivotal movement in either direction about the axis of the pivot pin 23a.

The handle 15a comprises a tubular core shank 80 desirably of aluminum or similar light metal having rigidly attached to its inner end in embracing relationship therewith by press-fitting and/or welding, the ferrule 77.

At its other outer end, the handle shank 80 is tightly embraced by a grip 81 in the form of a sleeve of suitable non-slippable material such as cork. This grip 81 is retained against axial movement by a collar 82, desirably of lightweight material, such as plastic, tightly embracing the shank 80, rigidly retained thereon, as for example, by cement, and bearing against the inner end of said grip. A similar collar 83 at the outer end of the shank 80 desirably having a diameter substantially equal to that of the grip 81 is retained on said shank against the outer end of said grip by a tight embracing fit and/or cement and also by the head of a screw 84 threaded into the outer end of said shank.

The slide piece 33a for engaging the catch 30a, and thereby releasably locking the handle 15a against counterclockwise rotation (Fig. 11) about the pivot axis in extended position of said handle is, desirably, of light-weight material such as aluminum and comprises a latch head 85 at its inner end in the form of a cylinder having a free slide fit in the handle core shank 80, a tail 86 at its outer end having a free slide fit in said handle core shank, and a solid axial rod 87 of reduced diameter interconnecting said head and said tail. The slide piece 33ª is urged towards the catch 30ª by the coil spring 36ª bearing at one end against the tail end 86 of said slide piece and bearing at its other end against a fixed abutment in the form of a bushing 83 desirably of light-weight material, such as aluminum press-fitted into the interior of the shank 80 at its outer end, and retained against outward axial movement by the screw 84.

The slide piece 33ª is adapted to be urged inwardly towards the catch 30ª by the spring 36ª, until the inner end of the latch head 85 engages the end of said catch. The upper side of the latch head 85 has a bevel surface 90 to permit the easy sliding of said latch head underneath the catch 30ª into latched position shown. In this latched position, the handle 15ª is locked against pivotal movement in either direction.

To permit manual withdrawal of the slide piece 33ª out of latched engagement with the catch 30ª, there is secured to the tail 86 of said slide piece the pin 41ª extending through the opening 42ª in the shank 80 and grip 81, and terminating at its end in the accessible finger head or button 43ª.

For camming the slide piece 33ª outwardly against the action of the spring 36ª as the latch head 85 rides over the bend of the catch 30ª, said latch head has a cam follower surface 35ª.

When the landing net of Figs. 10, 11 and 12 is folded into inoperative position, the latch head 85 will be held in its position (Fig. 11) by the spring 36ª. When the landing net is whipped into extended position, as the catch 30ª enters the handle opening defined between the ferrule ear extensions 78, it will ride along the follower edge 35ª of the latch head 85, thereby camming the slide piece 33ª lengthwise against the action of the spring 36ª. After the end of the catch 30ª has cleared the latch head 85 in extended position of the handle 15ª, said head will snap underneath said catch end under the action of the spring 36ª into the position shown in Figs. 10 and 11, to lock the handle 15ª and the net frame 11ª against folding action or pivotal movement in either direction.

Other operations of the landing net of Figs. 10, 11 and 12 are similar to those of the net of Figs 1–9 described.

In the following claims, by attachment to the "angler's garment" is meant not only attachment to the article of clothing which the angler may be wearing, but also to any device which he may have on, such as the creel harness, and which may be suitable for the anchoring of the clasp 50 thereto.

While the invention has been described with particular reference to specific embodiments, it is to be understood that it is not to be so limited thereto, but is to be construed broadly and restricted solely by the scope of the appended claims.

What is claimed is:

1. In a foldable fish landing net, the combination comprising a net frame, a handle, means pivotally securing said handle to said net frame, to permit said handle to be folded inwardly over said frame into inoperative position, or to be swung outwardly into extended operative position and a latch device operable to lock said handle in extended position automatically when said handle is swung into said operative position, comprising a catch, a slide bolt having a finger piece extending laterally through the wall of the handle and carried by said handle, for engagement with said catch, said finger piece being easily accessible for manipulation into latch releasing position by the thumb of the hand grasping said handle, and a spring urging said slide bolt toward said catch.

2. In a foldable fish landing net, the combination comprising a net frame, a hollow handle, means pivotally securing said handle to said net frame to permit said handle to be folded inwardly over said frame into inoperative position or to be swung outwardly into extended operative position, and a latch device operable to lock said handle in extended position automatically when said handle is swung into said operative position comprising a catch rigid with said frame, a bolt in the hollow of said handle slidable therealong towards and away from said catch, and a spring urging said bolt towards said catch in latch engagement therewith.

3. In a foldable fish landing net, the combination comprising a hoop net frame having two ends, a handle, a generally U-shaped bracket having a bottom wall and side walls, the ends of said frame being secured to said side walls, hinge support means rigidly secured to said bracket, and means for pivotally connecting said handle to said hinge support means at a section spaced inwardly from the outer end of said bracket, whereby in extended operative position of said handle, the inner end section of said handle extends between said side bracket walls and rests against said bottom bracket wall.

4. In a foldable fish landing net, the combination as defined in claim 3, said side bracket walls converging outwardly away from said net frame in extended condition of the net, said bracket defining with its side walls channels for receiving the ends of said frame.

5. In a foldable fish landing net, the combination as defined in claim 3, said hinge support means comprising a pair of parallel plates secured to and extending along and over said bottom bracket wall, the inner end section of said handle being located between said plates and extending therealong, and said handle being pivotally connected to said plates near the inner ends thereof.

6. In a foldable fish landing net, the combination as defined in claim 3, said hinge support means comprising a pivot pin holder, a support for said holder secured to said bracket, and a pivot pin in said holder, the inner end section of said handle engaging said pivot pin for pivotal movement about the axis of said pivot pin.

7. In a foldable fish landing net, the combination as defined in claim 3, said hinge support means comprising a pivot pin holder in the form of a block, a support for said holder secured to said bracket, and a pivot pin retained on said block and projecting from the ends thereof, said handle having at its inner end a pair of ears flanking said block and engaging the projecting ends of said pivot pin to permit said handle to hinge about the axis of said pivot pin.

8. In a foldable fish landing net, the combination as defined in claim 3, said hinge support means comprising a pivot pin holder in the form of a block, a support for said holder comprising a strip having its intermediate section folded in the form of a loop to embrace said block and having its sections on opposite sides of said loop disposed in overlapping relationship and secured to said bottom bracket wall, and a pivot pin retained on said block and projecting from the ends thereof, said handle having at its inner end a ferrule with a pair of ear extensions flanking said block and engaging the projecting ends of said pivot pin to permit said handle to pivot about the axis of said pivot pin.

9. In a foldable fish landing net, the combination as defined in claim 3, said hinge support means comprising a pivot pin holder in the form of a block, a support for said holder comprising a strip having its intermediate section folded in the form of a loop to embrace said block and having its sections on opposite sides of said loop disposed in overlapping relationship and secured to said bottom bracket wall, one of said sections terminating at its outer end in a catch adapted to engage a clasp on the garment of the fisherman to releasably support the landing net therefrom, and a pivot pin retained on said block and projecting from the ends thereof, said handle having at its inner end a pair of ears flanking said block and engaging the projecting ends of said pivot pin to permit said handle to hinge about the axis of said pivot pin.

10. In a foldable fish landing net, the combination as defined in claim 3, said hinge support means comprising a pivot pin holder in the form of a block, a support for said holder comprising a strip having its intermediate section folded in the form of a loop to embrace said block and having its sections on opposite sides of said loop disposed in overlapping relationship and secured to said bottom bracket wall, one of said sections terminating at its outer end in a catch extending upwardly from said bottom bracket wall, a pivot pin retained on said block and projecting from the ends thereof, said handle having at its inner end a pair of ears flanking said block and engaging the projecting ends of said pivot pin to permit said handle to hinge about the axis of said pivot pin, a slide piece carried by said handle and operable to latch into said catch and lock said handle against hinge movement, when said handle is in extended operative position, and a spring urging said slide piece toward said catch.

11. In a foldable fish landing net, the combination as defined in claim 3, said hinge support means comprising a pivot pin holder in the form of a block, a support for said holder comprising a strip having its intermediate section folded in the form of a loop to embrace said block and having its sections on opposite sides of said loop disposed in overlapping relationship and secured to said bottom bracket wall, one of said sections terminating at its outer end in a catch extending upwardly from said bottom bracket wall, a pivot pin retained on said block and projecting from the ends thereof, said handle having at its inner end a pair of ears flanking said block and engaging the projecting ends of said pivot pin to permit said handle to hinge about the axis of said pivot pin, a slide piece carried by said handle and operable to latch into said catch and lock said handle against hinge movement, when said handle is in extended operative position, the other strip section terminating at its outer end in a catch adapted to engage a clasp on the garment of the fisherman to releasably support the landing net therefrom, and a spring urging said slide piece toward said catch.

12. In a foldable fish landing net, the combination comprising a hoop net frame member, a handle member, a bracket connecting said members and having a wall along which the inner end section of said handle member is adapted to bear in extended operative position of said handle member, means for pivotally securing the other member to said bracket, to permit said members to be folded into overlapping position, a catch rigid with said bracket wall, the inner end section of said handle member having an opening to receive said catch when said handle member and net member are extended in operative position, said handle member having a hollow, and a slide piece in said hollow operable to latch into said catch and lock said handle member against pivotal movement, when said handle member is in extended operative position.

13. In a foldable fish landing net, the combination as defined in claim 12, said handle member being made substantially of one piece and hollowed to receive said slide piece, and a spring urging said slide piece toward said catch.

14. In a foldable fish landing net, the combination as defined in claim 12, said handle comprising a tubular core shank, means at the inner end of said shank for pivotally mounting said handle member with respect to said frame member, and a grip sleeve embracing the outer end section of said shank, said slide piece being located in said shank for slide movement therein.

ALFRED C. ROSS.

References Cited in the file of this patent

UNITED STATES PATENTS

| Number | Name | Date |
|---|---|---|
| 165,236 | Jenness | July 6, 1875 |
| 356,636 | Gros | Jan. 25, 1887 |
| 440,568 | Hebard | Nov. 11, 1890 |
| 941,961 | Spiegle | Nov. 30, 1909 |
| 1,013,347 | Wetzel | Jan. 2, 1912 |
| 2,032,664 | Raptis | Mar. 3, 1936 |
| 2,091,716 | Petta | Aug. 31, 1937 |
| 2,212,756 | Stewart | Aug. 27, 1940 |
| 2,281,999 | Rieback | May 5, 1942 |
| 2,491,703 | Bell | Dec. 30, 1949 |

FOREIGN PATENTS

| Number | Country | Date |
|---|---|---|
| 12,887 | Great Britain | 1896 |
| 547,276 | France | Dec. 5, 1922 |
| 911,970 | France | Apr. 8, 1946 |
| 931,215 | France | Sept. 29, 1947 |